（12）United States Patent
Huang

(10) Patent No.: US 7,948,754 B2
(45) Date of Patent: May 24, 2011

(54) EXTERNAL HEAT DISSIPATION DEVICE

(75) Inventor: Chi-Shih Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/650,557

(22) Filed: Dec. 31, 2009

(65) Prior Publication Data

US 2011/0096497 A1      Apr. 28, 2011

(30) Foreign Application Priority Data

Oct. 22, 2009   (CN) .......................... 2009 1 0308629

(51) Int. Cl.
*H05K 7/20*       (2006.01)
*G06F 1/16*       (2006.01)

(52) U.S. Cl. .................... 361/692; 361/679.48; 361/694; 361/695; 361/725; 165/104.34; 165/121; 165/122; 454/184

(58) Field of Classification Search ............ 361/679.46, 361/679.47, 679.48, 679.49, 679.51, 690–697, 361/714–727; 165/80.2, 80.3, 104.33, 104.34, 165/121–126, 185; 454/184, 347; 415/108, 415/119, 213.1, 214.1, 232; 417/360, 423.5–423.15; 416/244 R, 247 R; 312/223.2, 236
See application file for complete search history.

(56) References Cited

U.S. PATENT DOCUMENTS

| | | | | |
|---|---|---|---|---|
| 4,744,005 A * | 5/1988 | Milani ...................... | 361/679.48 |
| 5,475,563 A * | 12/1995 | Donahoe et al. ............. | 361/695 |
| 5,772,500 A * | 6/1998 | Harvey et al. ................ | 454/184 |
| 5,862,037 A * | 1/1999 | Behl ........................ | 361/679.49 |
| 5,898,568 A * | 4/1999 | Cheng .......................... | 361/695 |
| 5,898,569 A * | 4/1999 | Bhatia .......................... | 361/700 |
| 5,955,955 A * | 9/1999 | Corcoran et al. ............. | 340/607 |
| 6,031,718 A * | 2/2000 | Suzuki et al. ................ | 361/695 |
| 6,034,871 A * | 3/2000 | Cheng .......................... | 361/695 |
| 6,042,474 A * | 3/2000 | Harvey et al. ................. | 454/184 |
| 6,058,009 A * | 5/2000 | Hood et al. ............... | 361/679.47 |
| 6,104,607 A * | 8/2000 | Behl ........................ | 361/679.49 |
| 6,168,396 B1 * | 1/2001 | Homola ................... | 417/423.14 |
| 6,246,579 B1 * | 6/2001 | Lin .............................. | 361/695 |
| 6,252,770 B1 * | 6/2001 | Yu et al. ....................... | 361/695 |
| 6,362,958 B1 * | 3/2002 | Yu et al. ................... | 361/679.48 |
| 6,459,575 B1 * | 10/2002 | Esterberg ................. | 361/679.47 |
| 6,549,406 B1 * | 4/2003 | Olesiewicz et al. ........... | 361/695 |
| 6,563,703 B2 * | 5/2003 | Xie ........................... | 361/679.33 |
| 6,571,340 B1 * | 5/2003 | Lee ................................ | 713/300 |
| 6,724,626 B1 * | 4/2004 | Hodes et al. ................. | 361/700 |
| 6,781,846 B1 * | 8/2004 | Suzuki et al. ................. | 361/737 |

(Continued)

FOREIGN PATENT DOCUMENTS

DE           29704971 U1 *   7/1997

(Continued)

*Primary Examiner* — Michael V Datskovskiy
(74) *Attorney, Agent, or Firm* — Zhigang Ma

(57) ABSTRACT

An external heat dissipation device includes a housing, a circuit board placed in the housing, a fan electrically connected to the circuit board, and a wire electrically connected to the circuit board to power the fan. The housing includes an installation dock defining a receiving space for receiving the fan therein, and an insertion portion extending from the installation dock. A through hole is defined in the installation dock. An air passage is defined in the insertion portion. The fan includes a casing defining a first air hole communicating with the through hole and a second air hole communicating with the air passage.

8 Claims, 3 Drawing Sheets

U.S. PATENT DOCUMENTS

| | | | |
|---|---|---|---|
| 7,126,818 B2 * | 10/2006 | Lu et al. | 361/695 |
| 7,140,193 B2 * | 11/2006 | Johnson et al. | 62/255 |
| 7,301,766 B2 * | 11/2007 | Huang et al. | 361/695 |
| 7,411,788 B2 * | 8/2008 | Liang | 361/695 |
| 7,564,681 B2 * | 7/2009 | Chen | 361/679.49 |
| 7,652,881 B1 * | 1/2010 | Sun | 361/694 |
| 7,715,193 B1 * | 5/2010 | Ye et al. | 361/695 |
| 7,817,416 B2 * | 10/2010 | Chen | 361/679.48 |
| 2010/0033929 A1 * | 2/2010 | Chen | 361/695 |

FOREIGN PATENT DOCUMENTS

| | | | |
|---|---|---|---|
| EP | 0852350 A2 | * | 7/1998 |
| JP | 410049258 A | * | 2/1998 |
| JP | 2000231424 A | * | 8/2000 |
| JP | 02000353891 | * | 12/2000 |
| JP | 2001014068 A | * | 1/2001 |

* cited by examiner

EXTERNAL HEAT DISSIPATION DEVICE

BACKGROUND

1. Technical Field

The disclosure relates to heat dissipation devices, and particularly, to an external heat dissipation device for a portable electronic device.

2. Description of Related Art

At present, a thermal module is generally mounted on a central processing unit (CPU) inside a portable electronic device, such as a portable computer, causing heat generated by the CPU to be dissipated into the surrounding air. However, with the ever increasing integration density of CPUs, greater amounts of heat are being generated, requiring larger thermal modules for quickly and efficiently removing heat.

However, portable electronic devices are often designed to be compact for high portability. When trying to create small-sized portable electronic devices, the installation of a larger thermal module inside the portable electronic devices is undesirable.

DETAILED DESCRIPTION

Figure 1:
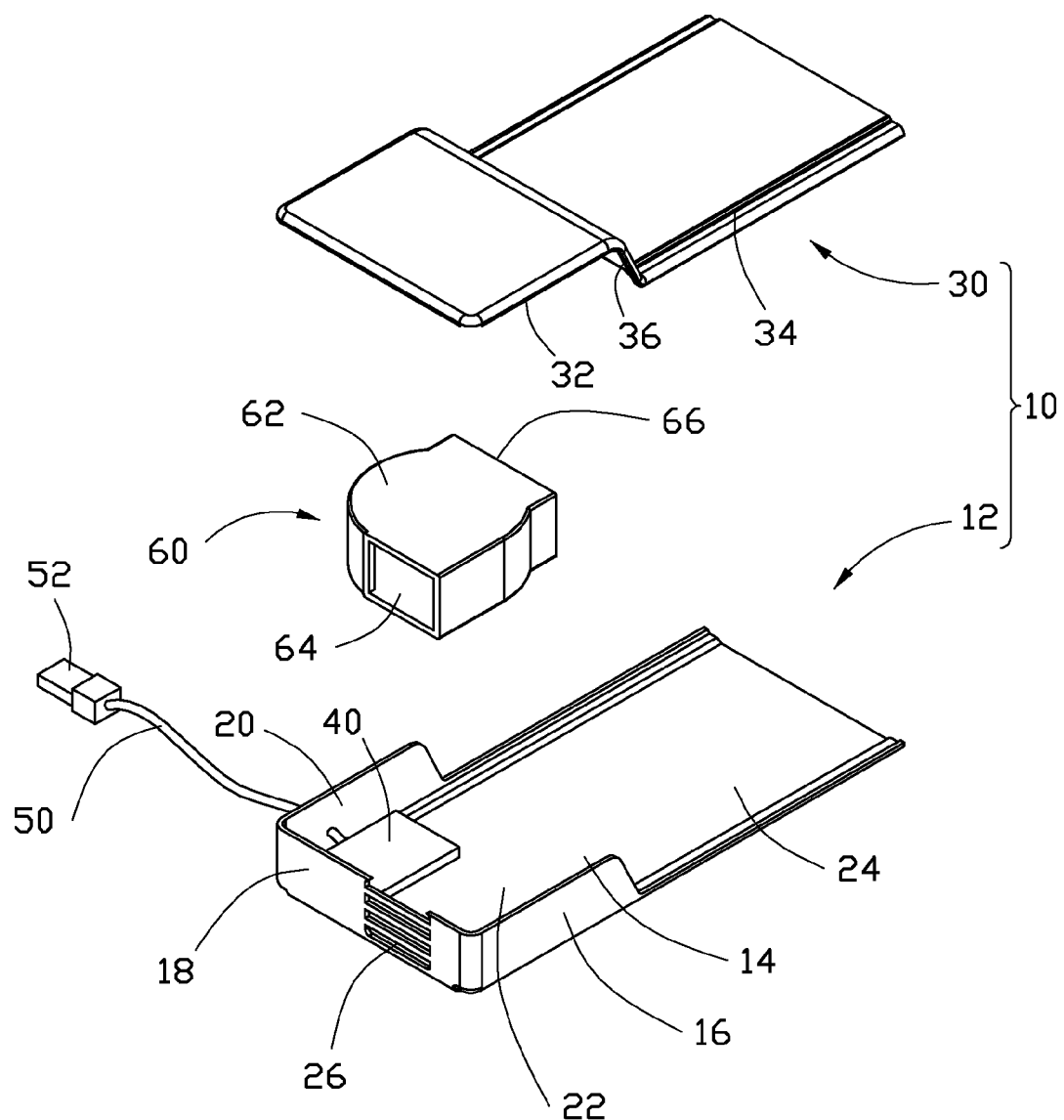
FIG. 1 is an exploded, isometric view of an exemplary embodiment of an external heat dissipation device.

Referring to FIG. 1, an exemplary embodiment of an external heat dissipation device includes a housing 10, a circuit board 40, a wire 50 electrically connected to the circuit board 40, and a fan 60.

The housing 10 includes an elongated base 12 and an elongated cover 30. The base 12 includes a panel 14. A generally U-shaped surrounding plate 20 extends from a first end of the panel 14. The surrounding plate 20 includes two opposite first walls 16 perpendicularly extending up from opposite sides of the panel 14, adjacent to the first end of the panel 14, and a second wall 18 perpendicularly connected between the first walls 16. The panel 14 and the first and second walls 16 and 18 together define a receiving space 22. An extension portion 24 extends from and is coplanar to a second end of the panel 14 opposite to the first end thereof. A plurality of air intakes 26 are defined in the second wall 18. The cover 30 includes a first coupling plate 32 for overlapping a top of the surrounding plate 20, and connected to an inclined connection plate 36 which in turn is connected to a second coupling plate 34 for overlapping the extension portion 24.

The fan 60 includes a hollow casing 62, and an electric motor (not shown) within the casing 62 and electrically connected to the circuit board 40. An air inlet 64 and an air outlet 66 are respectively defined in opposite ends of the casing 62.

Figure 2:
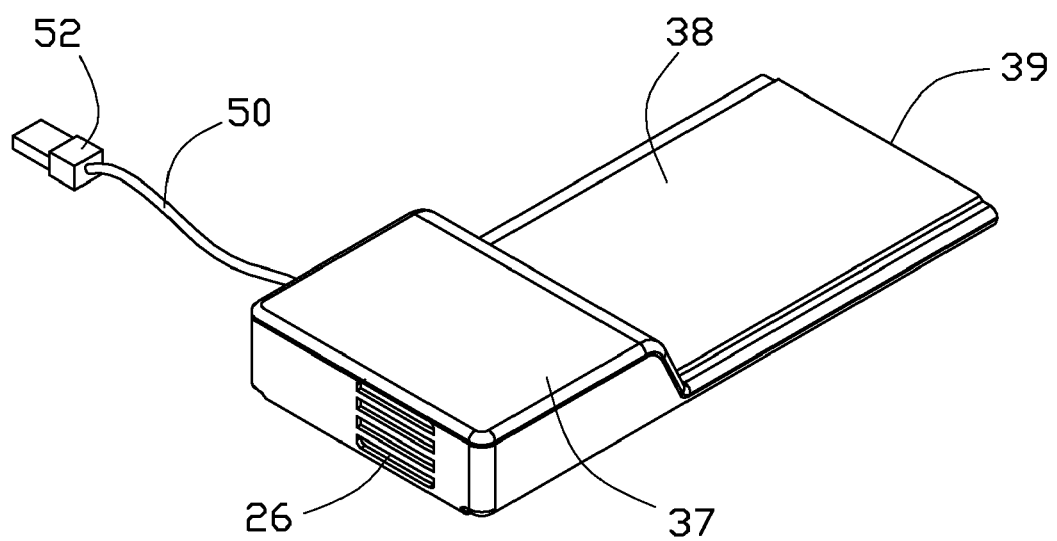
FIG. 2 is an assembled view of the device of FIG. 1.

Referring to FIG. 2, in assembly, the circuit board 40 and the fan 60 are attached to the panel 14 of the base 12, thereby the fan 60 is received in the receiving space 22. The electric motor of the fan 60 is electrically connected to the circuit board 40. The end defining the air inlet 64 of the casing 62 abuts the second wall 18 of the surrounding plate 20, with the air inlet 64 aligning with the plurality of air intakes 26, while the end defining the air outlet 66 of the casing 62 is located at the extension portion 24 of the base 12. The first and second coupling plates 32 and 34 respectively overlap the top of the surrounding plate 20 and the extension portion 24 of the base 12. Therefore, the cover 30 is installed to the base 12. The panel 14, the surrounding plate 20, and the first coupling plate 32 cooperatively form an installation dock 37 to receive the fan 60 and the circuit board 40. The extension portion 24 of the base 12 and the second coupling plate 34 of the cover 30 cooperatively form an insertion portion 38. An air passage 39 is defined between the extension portion 24 and the second coupling plate 34, extending along a lengthwise direction of the insertion portion 38 and communicating with the air outlet 66 of the casing 62. The wire 50 extends out of the housing 10. A power connector 52 is electrically connected to a distal end of the wire 50. In the exemplary embodiment, the power connector 52 is a universal serial bus (USB) connector.

Figure 3:
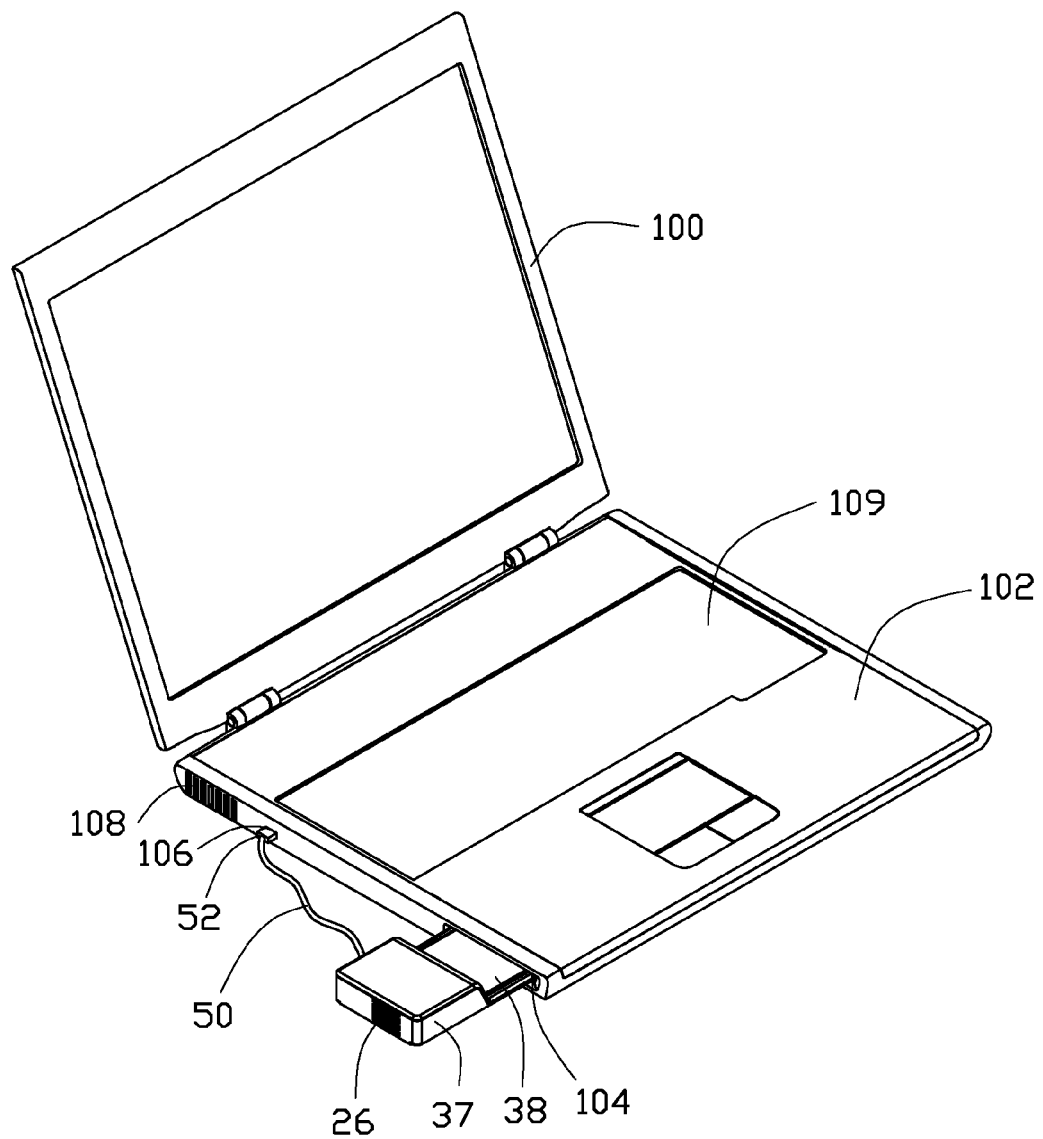
FIG. 3 is a view of the device of FIG. 2 as installed to a portable computer during use.

Referring to FIG. 3, in use, the insertion portion 38 of the external heat dissipation device is accommodated in a hole defined in a portable electronic device, such as a portable computer 100. In the exemplary embodiment, the hole is a slot 104 defined in a body 102 of the portable computer 100 for an expansion card. The power connector 52 is electrically connected to a USB port 106 on the body 102 to power the electric motor of the fan 60. When the electric motor of the fan 60 runs, air is drawn into the casing 62 of the fan 60 through the plurality of air intakes 26 and the air inlet 64, and then is directed to flow towards the air passage 39 through the air outlet 66. The air from the air passage 39 enters the body 102 of the portable computer 100 to dissipate heat generated by electrical components, such as a CPU and other electronic chips, within the portable computer 100. Heated air flows out of the body 102 through a plurality of vents 108 defined in the body 102 and/or through gaps between the body 102 and a keyboard 109 attached to the body 102, thereby heat in the body 102 of the portable computer 100 is quickly and efficiently dissipated.

In another embodiment, the slot 104 may be replaced with a slot for mounting a Personal Computer Memory Card International Association (PCMCIA) card. The power connector 52 may be replaced with a power plug. In use, the power plug is electrically connected to a power receptacle or a power outlet.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An external heat dissipation device comprising:
   a housing comprising an installation dock defining a receiving space therein, and an insertion portion extending from the installation dock; wherein a through hole is defined in the installation dock, an air passage is defined in the insertion portion;
   a circuit board arranged in the housing;
   a fan arranged in the receiving space and electrically connected to the circuit board, the fan comprising a casing defining a first air hole communicating with the through hole of the housing and a second air hole communicating with the air passage; and
   a wire electrically connected to the circuit board to power the fan.

2. The external heat dissipation device of claim 1, wherein the installation dock comprises a panel, a surrounding plate extending from sides of the panel, and a first coupling plate overlapping a top of the surrounding plate; and the panel and the surrounding plate define the receiving space.

3. The external heat dissipation device of claim 2, wherein the through hole of the housing is defined in the surrounding plate.

4. The external heat dissipation device of claim 2, wherein the insertion portion comprises an extension portion extending from the panel, and a second coupling plate overlapping the extension portion.

5. The external heat dissipation device of claim 4, wherein the air passage is defined between the extension portion and the second coupling plate.

6. The external heat dissipation device of claim 4, wherein the first and second coupling plates are integrally formed with an inclined connection plate connected between the first and second coupling plates.

7. The external heat dissipation device of claim 4, wherein the surrounding plate comprises two opposite first walls perpendicularly extending up from opposite sides of the panel, and a second wall perpendicularly extending up from a first end of the panel to connect the first walls.

8. The external heat dissipation device of claim 7, wherein the extension portion extends from a second end of the panel opposite to the first end thereof.

* * * * *